United States Patent [19]

Kanou et al.

[11] 4,351,560
[45] Sep. 28, 1982

[54] REMOVABLE ROOF OF A MOTOR VEHICLE

[75] Inventors: Noboru Kanou; Keiji Mori, both of Toyota, Japan

[73] Assignees: Toyota Jidosha Kogyo Kabushiki Kaisha; Aisin Seiki Kabushiki Kaisha, both of Aichi, Japan

[21] Appl. No.: 174,627

[22] Filed: Aug. 1, 1980

[30] Foreign Application Priority Data

Aug. 16, 1979 [JP] Japan .................. 54-103523

[51] Int. Cl.³ .................................. B60J 7/18
[52] U.S. Cl. ............................ 296/216; 296/218
[58] Field of Search ................. 296/216, 217, 218

[56] References Cited

U.S. PATENT DOCUMENTS

| | | | |
|---|---|---|---|
| 4,005,901 | 2/1977 | Lutke | 296/218 |
| 4,067,604 | 1/1978 | Mori | 296/217 |
| 4,126,352 | 11/1978 | Vogel | 296/218 |
| 4,165,120 | 8/1979 | Jardin | 296/217 |

*Primary Examiner*—Joseph F. Peters, Jr.
*Assistant Examiner*—John A. Carroll
*Attorney, Agent, or Firm*—Kenyon & Kenyon

[57] ABSTRACT

A removable roof, for covering the opening formed on the roof of a motor vehicle, comprising a tongue member which extends forwards from the front end of the removable roof. The tongue member is engageable with the hole of a hollow case fixed onto the roof of a motor vehicle. A U-shaped link is rotatably mounted on the roof of a vehicle at a position beneath the removable roof and is rotatable from a substantially horizontal lying position to a standing position. The removable roof has a latch groove formed thereon and coming into engagement with the U-shaped link when the removable roof is completely closed or partially opened.

27 Claims, 13 Drawing Figures

REMOVABLE ROOF OF A MOTOR VEHICLE

BACKGROUND OF THE INVENTION

The present invention relates to a removable roof for use in a motor vehicle.

Motor vehicles have been known in which an opening is formed in the roof and covered by a removable roof, sometimes called a sun roof. In a typical arrangement as heretofore proposed, a latch mechanism is provided for holding the front end of the removable roof and an opening and closing mechanism is provided connectable to the rear end of the removable roof. The latch mechanism comprises an arc-shaped tongue member extending from the front end of the removable roof, and an arc-shaped recess to receive the tongue member, the recess being formed in the stationary roof of the motor vehicle and extending forwards. The front end of the removable roof is secured onto the stationary roof by inserting the arc-shaped tongue into the arc-shaped recess while rotating the removable roof about an axis which corresponds to the center of curvature of the arc. However, since the front end of the prior removable roof is secured onto the stationary roof of the motor vehicle by merely inserting the arc-shaped tongue member into the matching recess, the tongue member moves to and fro within the recess. As a result, the removable roof rattles. In addition, in the worst case, there is a danger that the arc-shaped tongue member will come out from the recess.

OBJECTS AND SUMMARY OF THE INVENTION

An object of the present invention is to provide a removable roof capable of completely preventing the tongue member of a removable roof from coming out of a recess in which it should remain inserted.

Another object is to provide a removable roof that is free from rattling.

A further object is to provide means for smoothly opening and closing the removable roof without squeezing the weather stripping attached to its periphery.

According to the present invention, a motor vehicle having a stationary roof with front and rear ends and an opening intermediate the ends is provided with a removable roof removably mounted on the stationary roof and having a contour that corresponds to that of the opening. The front end of the removable roof is secured to the stationary roof by at least one tongue member extending from the front end of the removable roof substantially horizontally towards the front end of said stationary roof. At least one hollow case that has a recess to receive the tongue member is arranged on the stationary roof in the vicinity of the front end of the removable roof and at least one link member is pivotally mounted beneath the front end of the removable roof and has first and second ends. The second end is rotatably connected to either the removable roof or the stationary roof, the other one of which has a latch groove which is engageable with the first end of the link member when the latter is substantially horizontal.

The present invention may be more fully understood from the description of preferred embodiments of the invention set forth below, together with the accompanying drawings.

DESCRIPTION OF PREFERRED EMBODIMENTS

Figure 1:
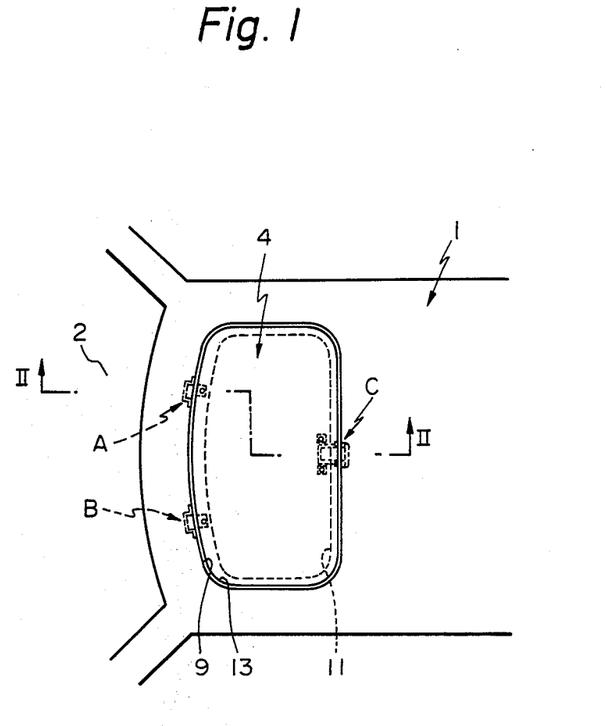
FIG. 1 is a plan view of the roof of a motor vehicle that includes this invention.
Figure 2:
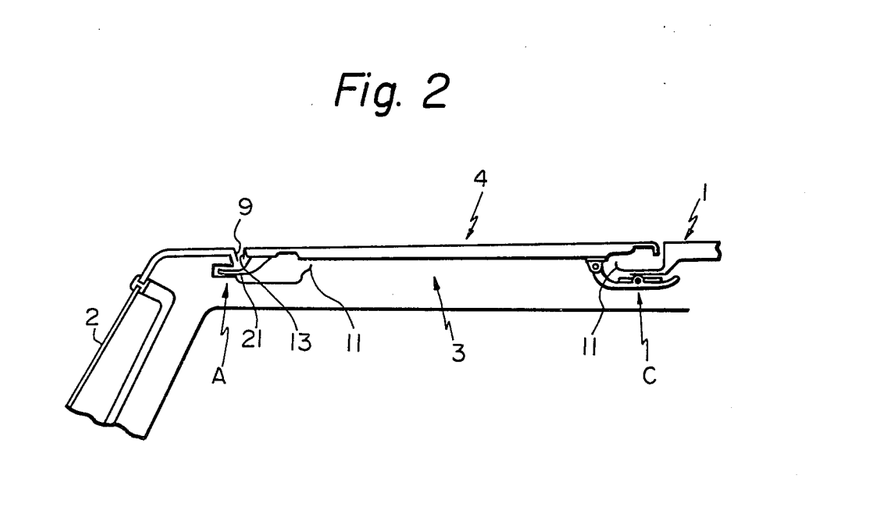
FIG. 2 is a cross-sectional side view taken along the line II—II in FIG. 1, illustrating the removable roof completely closed.

FIGS. 1 and 2 show a stationary roof 1 of a motor vehicle, a windshield 2, an opening 3 is the stationary roof 1, and a removable roof 4 arranged to cover the opening 3. A pair of latch mechanisms A, B is provided at the front end of the removable roof 4, and a removable roof opening and closing mechanism C is provided at the rear end of the removable roof 4.

Figure 4:
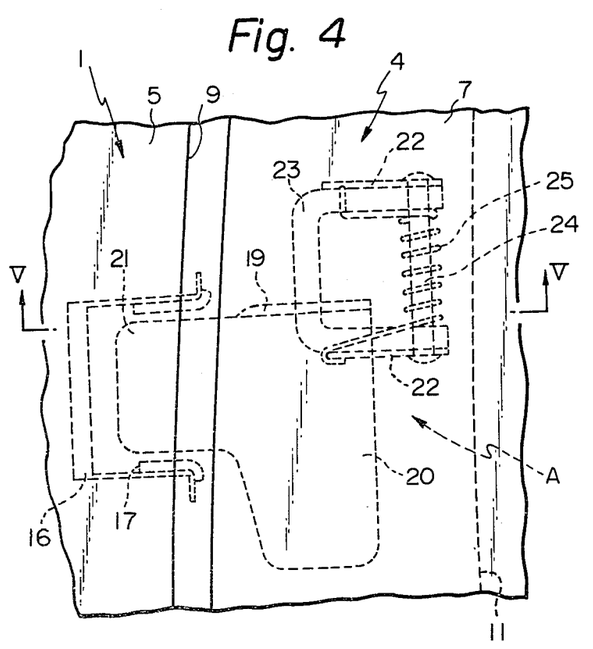
FIG. 4 is an enlarged plan view of an embodiment of the latch mechanism illustrated in FIG. 1 according to the present invention.
Figure 5:
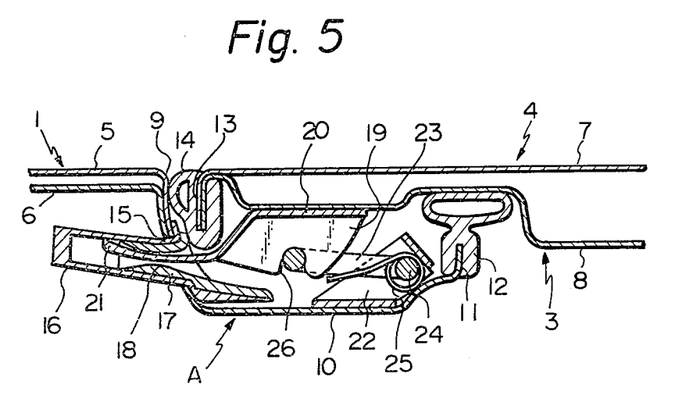
FIG. 5 is a cross-sectional side view taken along the line V—V in FIG. 4.

FIGS. 4 and 5 illustrate an enlarged view of the latch mechanism A. Since the latch mechanisms A and B have a symmetrical construction with respect to the longitudinal axis of a motor vehicle, the illustration of the latch mechanism B is omitted. In FIGS. 4 and 5, there is a stationary roof outer panel 5, a stationary roof inner panel 6, a removable roof outer panel 7, and a removable roof inner panel 8. The stationary roof outer panel 5 has a substantially vertically descending step portion 9 forming a frame for receiving the removable roof 4 therein and an annular inner circumferential portion 10 projecting from the lower end of the step portion 9 substantially horizontally towards the central portion of the opening 3 from every point along the entire length of the step portion. Weather stripping 12, made of a resilient material, is attached to the upwardly extending inner edge 11 of the portion 10. This weather stripping 12 defines the opening 3. In addition, another weather stripping 14, made of a resilient material, is attached to the downwardly extending outer edges 13 of the outer panel 7 and the inner panel 8 of the removable roof 4.

As illustrated in FIGS. 4 and 5, an aperture 15, having a rectangular cross-section, is formed in the step portion 9, and a hollow case 16 is inserted into the aperture 15 and affixed to the step portion 9. A hollow sleeve 17, made of synthetic resin, is inserted into the hollow case 16. From FIG. 5, it will be understood that the size of the recess formed in the hollow sleeve 17 is smallest at the central portion 18 of the hollow sleeve 17 and is gradually increased forwards and backwards from the central portion 18. A bracket 20 having a vertically extending flange 19 formed in one piece thereon is attached to the lower wall of the removable roof inner panel 8, and a tongue member 21, substantially horizontally extending forwards from the bracket 20, is formed as an integral part of the bracket 20. In addition, a bracket 22 is attached to the upper wall of the inner circumferential portion 10 in the rear of the hollow sleeve 17, and a U-shaped movable link 23 is pivotally connected to the bracket 22 by means of a pivot pin 24. A coil spring 25 surrounds the pivot pin 24, and the movable link 23 is always biased in the clockwise direction in FIG. 5 due to the resilient force of the coil spring 25. In addition, a latch groove 26, which is engageable with the movable link 23, is formed on the flange 19 of the bracket 20.

Figure 8:
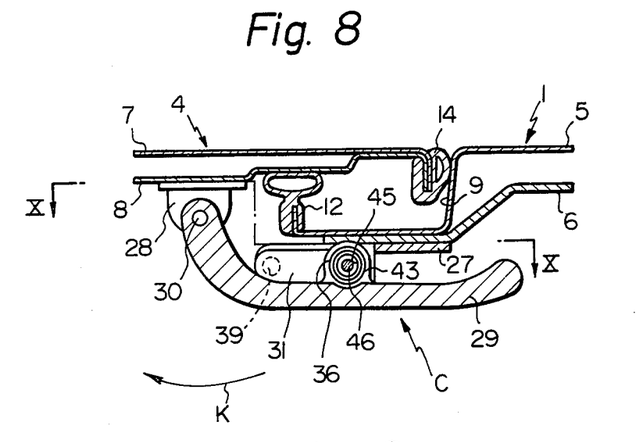
FIG. 8 is a cross-sectional side view of the removable roof opening and closing mechanism illustrated in FIG. 1, taken along the line VIII—VIII in FIG. 10.
Figure 9:
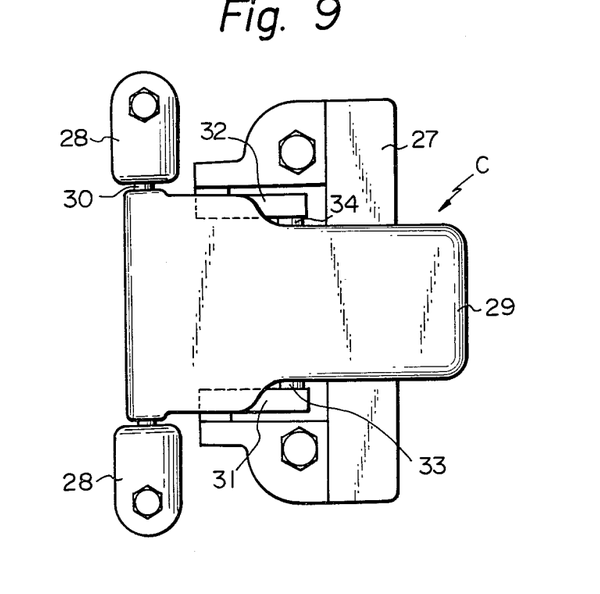
FIG. 9 is a bottom view of FIG. 8.
Figure 10:
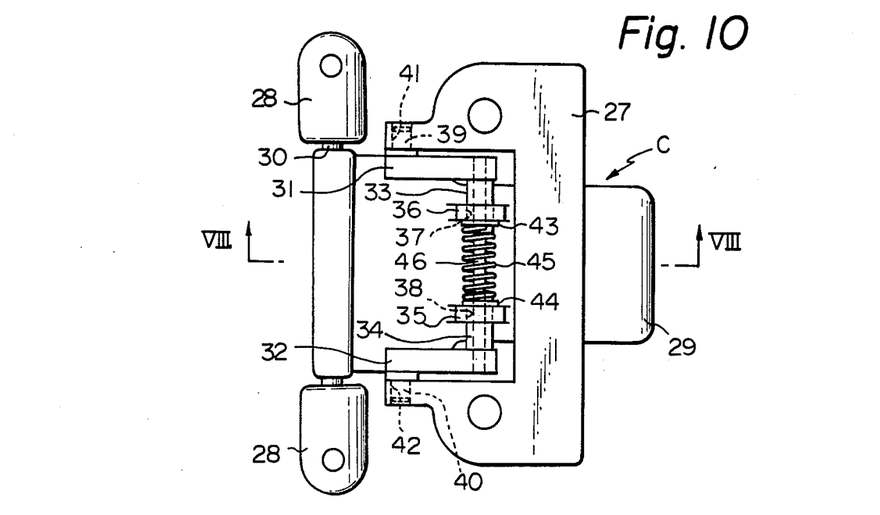
FIG. 10 is a plan view taken along the line X—X in FIG. 8.

FIGS. 8 through 10 illustrate enlarged views of the removable roof opening and closing mechanism C. This mechanism includes a base 27 on the lower face of the stationary roof inner panel 6, a pair of brackets 28 attached to the lower face of the movable roof inner panel 8, a handle member 29 pivotally connected to the brackets 28 by means of a pivot pin 30, and link members 31 and 32. Cylindrical portions 33 and 34 are integrally formed on the rear ends of the link members 31 and 32, respectively and, in addition, a pair of brackets 35 and 36 is integrally formed on the handle member 29. Bores 37 and 38 are formed in the brackets 35 and 36, respectively, and the cylindrical portions 33 and 34 of the link members 31 and 32 are rotatably inserted into the bores 37 and 38 of the brackets 35 and 36, respectively. In addition, cylindrical projections 39 and 40 are integrally formed on the front ends of the link members 31 and 32, respectively. Bores 41 and 42 are formed on the base 27, and the cylindrical projections 39 and 40 of the link members 31 and 32 are rotatably and removably inserted into the bores 41 and 42 of the base 27, respectively. Rings 43 and 44 are secured onto the inner ends of the cylindrical portions 33 and 34 of the link members 31 and 32, respectively, and a compression spring 45 surrounds the rings 43 and 44. A rod 46, extending between the link members 31 and 32, is inserted into the cylindrical portions 33 ad 34 of the link members 31 and 32. One end of the rod 46 extends into the cylindrical portion 33 of the link member 31, and the other end of the rod 46 is slidably inserted into the cylindrical portion 34 of the link member 32.

FIGS. 5 and 8 illustrate the latch mechanism A and the removable roof opening and closing mechanism C when the opening 3 is completely closed by the removable roof 4 as illustrated in FIG. 2. In FIGS. 5 and 8, the weather stripping 14 is in sealing contact with the step portion 9 of the stationary roof outer panel 5 and is also in sealing contact with the removable roof inner panel 8. In addition, as illustrated in FIG. 5, the tongue member 21 is inserted into the deep interior of the hollow case 16, and the U-shaped movable link 23 is in a horizontal position in engagement with the latch groove 26 of the bracket 20.

Figure 3:
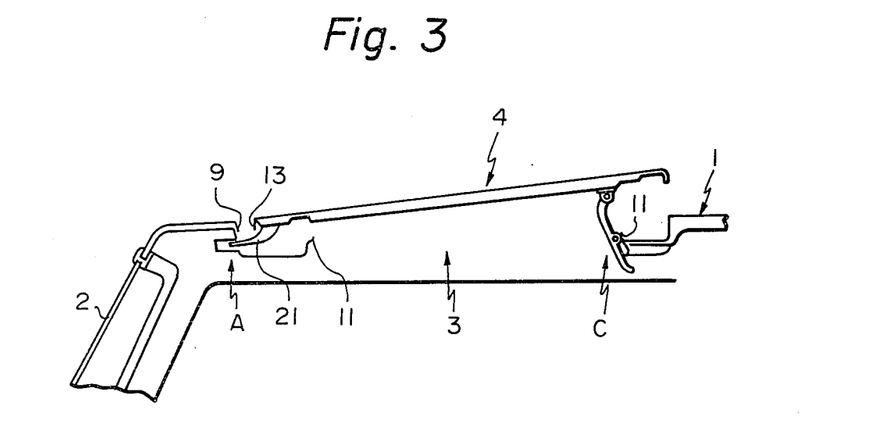
FIG. 3 is a cross-sectional side view taken along the line II—II in FIG. 1, illustrating the removable roof partially opened.
Figure 6:
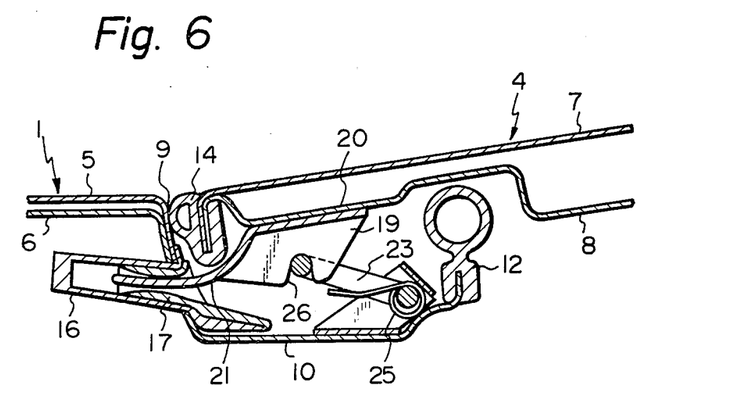
FIG. 6 is a cross-sectional side view illustrating the same cross-section as that of FIG. 5 and illustrating the removable roof partially opened.
Figure 11:
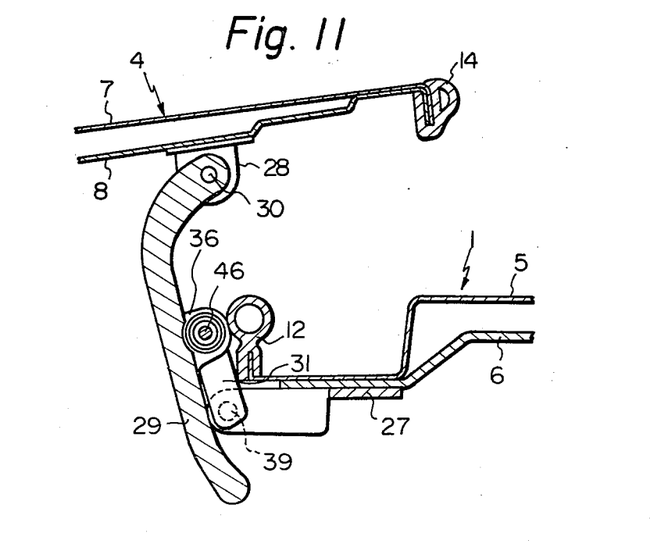
FIG. 11 is a cross-sectional side view illustrating the same cross-section as that of FIG. 8 with the removable roof partially opened.

When the handle member 29 is manually rotated in the direction illustrated by the arrow K in FIG. 8 and moved to a position illustrated in FIG. 11, the removable roof 4 is partially opened, as illustrated in FIG. 3. When the handle member 29 is so rotated, the rear end of the removable roof 4 moves upwards, as illustrated in FIG. 6, and the movable link 23 slightly rotates in a clockwise direction due to the spring force of the coil spring 25, maintaining engagement between the movable link 23 and the latch groove 26. This causes the tongue member 21 to be slightly pulled out of the hollow case 16, and the removable roof 4 moves backwards by a slight distance. Consequently, when the rear end of the removable roof 4 moves upwards, since the weather stripping 14 moves away from the step portion 9, there is no possibility that the weather stripping 14 will be squeezed between the removable roof 4 and the step portion 9. In addition, when the removable roof 4 is partially opened, the movable link 23, which is in engagement with the latch groove 26, is in a substantially horizontal position. As a result of this, even if a strong horizontal force acts on the removable roof 4, there is no possibility that the tongue member 21 will come out of the hollow case 16.

Figure 7:
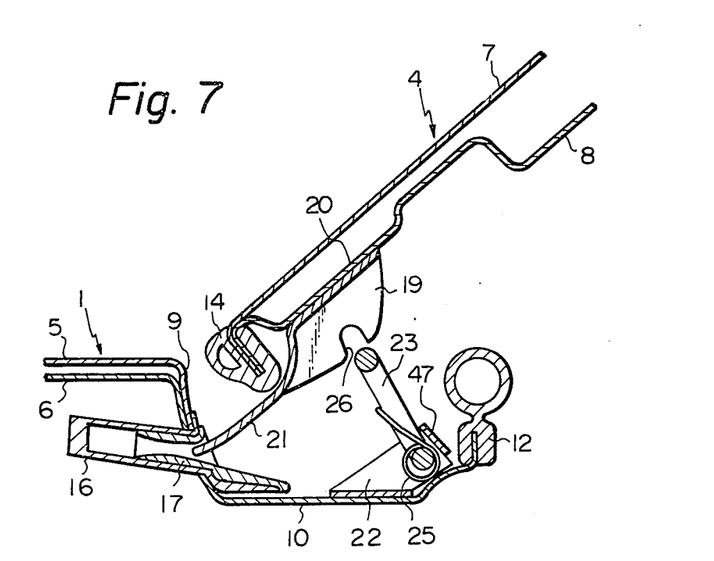
FIG. 7 is a cross-sectional side view illustrating the same cross-section as that of FIG. 5 at the moment when the removable roof is being removed.

In FIG. 10, if the link members 31 and 32 are manually pressed inwards against the spring force of the compression spring 45 so that the cylindrical projections 39, 40 of th link members 31, 32 are pulled out of the bores 41, 42 of the base 27, the handle member 29 is detached from the base 27, together with the link members 31, 32. After this, when the rear end of the removable roof 4 is manually lifted to a position which is higher than that illustrated in FIG. 11, the movable link 23 is disengaged from the latch groove 26, as illustrated in FIG. 7. Then, the tongue member 21 is completely pulled out of the hollow case 16 so that the removable roof 4 can be removed from the stationary roof 1. During the time the removable roof 4 is lifted from the position illustrated in FIG. 11 to the position illustrated in FIG. 7, the weather stripping 14 moves away from the step portion 9. As a result of this, there is no possibility that the weather stripping 14 will be squeezed between the step portion 9 and the removable roof 4. From FIG. 7, it will be understood that, when the removable roof 4 is removed from the stationary roof 1, the coil spring 25 resiliently forces the movable link 23 into engagement with a stop 47 formed on the bracket, so that the movable link 23 is maintained in a standing position, as illustrated.

When the removable roof 4 is attached to the stationary roof 1, the tip of the tongue member 21 is inserted into the hollow case 16 as illustrated in FIG. 7. After this, the latch groove 26 of the bracket 20 is engaged with the movable link 23 and, then, the rear end of the removable roof 4 is pulled down.

Figure 12:
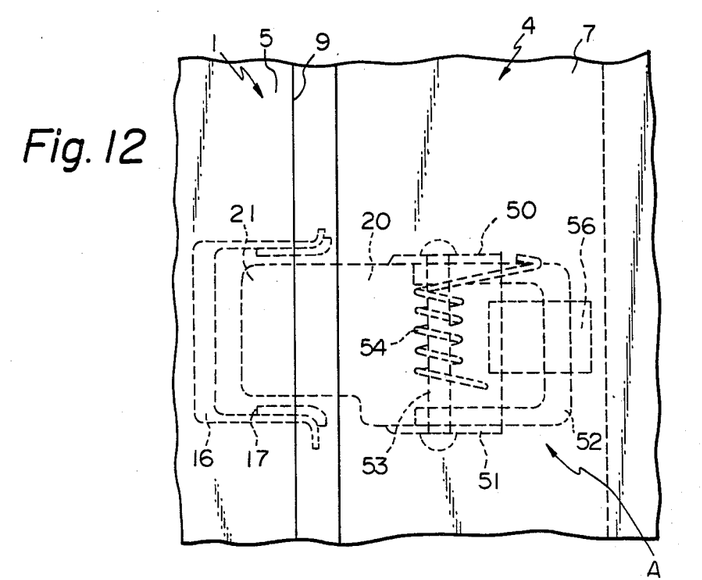
FIG. 12 is an enlarged plan view of an alternative embodiment of the latch mechanism according to the present invention.
Figure 13:
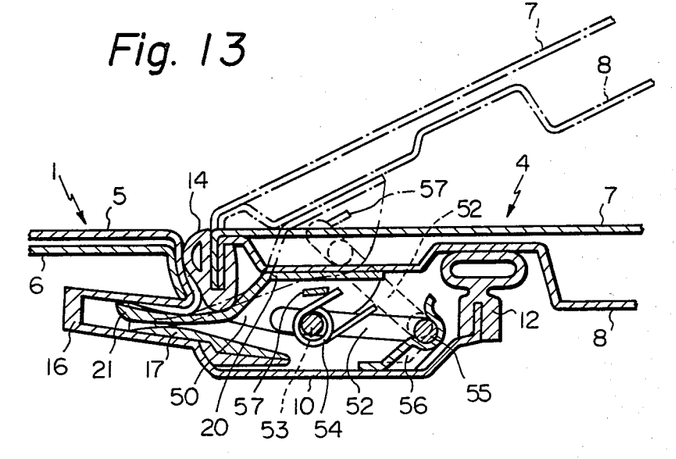
FIG. 13 is a cross-sectional side view of FIG. 12.

FIGS. 12 and 13 illustrate an alternative embodiment according to the present invention. In FIGS. 12 and 13, similar components are indicated with the same reference numerals used in FIGS. 4 and 5. Referring to FIGS. 12 and 13, the bracket 20 that has the tongue member 21 also has a pair of downwardly extending vertical flanges 50 and 51. A U-shaped movable link 52 is pivotally connected to the vertical flanges 50 and 51 by means of a pivot pin 53. A coil spring 54 surrounds the pivot pin 53, and the movable link 52 is biased in the clockwise direction in FIG. 13 due to the spring force of the coil spring 54. In addition, a bracket 56 is attached to the inner circumferential portion 10 of the stationary roof inner panel 6, and a latch groove 55, which is engageable with the movable link 52, is formed in the bracket 56.

When the removable roof 4 is in its closed position, as illustrated is full line in FIG. 13, the movable link 52 is in a horizontal position wherein it is in engagement with the latch groove 55 of the bracket 56. When the removable roof 4 is opened, as illustrated by the dot-dash-line in FIG. 13, the movable link 52 rotates in the clockwise direction in FIG. 13 due to the spring force of the coil spring 54 and maintains engagement between the movable link 52 and the latch groove 55 of the bracket 56. When the tongue member 21 is completely pulled out of the hollow case 16, the movable link 52 comes into engagement with a stop 57 formed on the flange 50.

According to the present invention, when the rear end of the removable roof 4 is manually lifted in order to open the removable roof 4, the weather stripping 14 moves away from the step portion 9 of the stationary roof outer panel 5 and is not squeezed between the step portion 9 and the removable roof 4. As a result of this, it is possible to ensure the long life of the weather stripping 14. In addition, when the removable roof 4 is completely closed or only partially opened, the movable link 23, 52 is in a substantially horizontal position. As a result of this, since the tongue member 21 does not move to and fro within the hollow case 16, it is possible to prevent the removable roof 4 from rattling. Furthermore, there is no danger that, when the removable roof 4 is partially opened, the tongue member 21 will come out of the hollow case 16 and, therefore, there is also no danger that the removable roof 4 will be dislodged from the stationary roof 4. According to experiments conducted by the inventors, it has been proven that the removable roof 4 will remain engaged with the stationary roof 1 even if a force of 30 G acts on the body of the motor vehicle, either in the longitudinal direction or in the transverse direction thereof.

While the invention has been described by reference to specific embodiments chosen for purposes of illustration, it should be apparent that numerous modifications could be made thereto by those skilled in the art without departing from the spirit and scope of the invention.

We claim:

1. In a roof structure of a motor vehicle having a stationary roof that has front and rear ends and an opening formed in a region intermediate the front and rear ends, and a removable roof removably mounted on the stationary roof above the opening and having a contour shape that corresponds to the contour shape of the opening and having a front end and a rear end, the invention comprising:
   first means for securing the front end of said removable roof to the stationary roof, said first means comprising at least one tongue member located on the front end of said removable roof and extending substantially horizontally towards the front end of said stationary roof, at least one hollow case on the stationary roof in the vicinity of the front end of said removable roof and having therein a recess with which said tongue member is engageable, and at least one link member arranged to be rotatable from a substantially horizontal position to a standing position, said link member being located in a position that is beneath the front end of said removable roof when the latter is in its closed position, said link member having first and second ends, said second end rotatably engaging the stationary roof, said first means further comprising a latch groove which is engageable with said link member when said link member is in said substantially horizontal position, the direction in which said latch groove is open being such as to release said link member only when the rear end of said removable roof is pivoted upward and forward; and
   second means arranged on the stationary roof and cooperating with the rear end of said removable roof for securing the rear end of said removable roof to the stationary roof.

2. The invention as claimed in claim 1, wherein the stationary roof has a downwardly extending step portion defining the opening of the stationary roof, said hollow case being attached to said step portion.

3. The invention as claimed in claim 2, wherein said hollow sleeve has a hollow sleeve inserted therein and made of synthetic resin, the hole of said hollow case being formed in said hollow sleeve and extending substantially horizontally.

4. The invention as claimed in claim 3 wherein said hollow sleeve has a central portion at which the size of said hole is minimum, the cross-sectional size of said hole being gradually increased towards the front end and the rear end of said stationary roof.

5. The invention as claimed in claim 3 wherein said removable roof has weather stripping on the contour edge thereof and being engageable with said step portion.

6. The invention as claimed in claim 1 wherein the stationary roof has an inner circumferential portion extending along a peripheral portion of said removable roof at a position beneath said removable roof, the second end of said link member being rotatably connected to said inner circumferential portion.

7. The invention as claimed in claim 6 wherein said link member has a U-shape.

8. The invention as claimed in claim 6 comprising a spring engaging said link member and biasing said link member from said substantially horizontal position towards said standing position.

9. The invention as claimed in claim 6 wherein said inner circumferential portion has an inner edge onto which a weather strip is attached, said weather strip defining said opening of the stationary roof, said removable roof having a lower surface engageable with said weather strip.

10. The invention as claimed in claim 1 wherein said removable roof has a lower surface and a downwardly extending flange affixed to said lower surface, said tongue member being an integral part of said flange, said latch groove being on said flange.

11. The invention as defined in claim 1 in which said removable roof comprises means extending toward said one end of said link member and comprising said latch groove, said latch groove being open downwardly and said second end of said link member be rotatably connected to the stationary roof to remain connected thereto when the removable roof has been removed.

12. The invention as defined in claim 1 comprising:
   downwardly extending means on said removable roof to hold said one end of said link member rotatably; and
   means on said stationary roof defining said latch groove and open forwardly to engage said second end of said link member rotatably and releasably.

13. The invention as defined in claim 11 in which said downwardly extending means comprises a stop to engage said link member to limit rotational movement thereof.

14. The invention as defined in claim 1 wherein said stationary roof has a lower face and said second means comprises:
   a base on said lower face of said stationary roof;
   at least an additional link member having first and second ends, the second end of said additional link member being pivotally connected to said base; and
   a handle member interconnecting the first end of said additional link member to the rear end of said removable roof, said handle member being movable from a position wherein said removable roof is completely closed to a position wherein said removable roof is partially opened.

15. The invention as claimed in claim 14 wherein said base has at least one bore formed thereon, the second end of said additional link member having a projection which is engageable with said bore, said second means further comprising a spring connected to said link member to spring load said link member towards said bore to maintain the engagement relationship between said projection and said bore.

16. In a roof structure of a motor vehicle having a stationary roof which has front and rear ends and an opening formed therein intermediate the ends, and a removable roof removably mounted on the stationary roof at a position above the opening and having a contour shape which corresponds to that of the opening, said removable roof having a front end and a rear end:
   first means for securing the front end of said removable roof onto the stationary roof, said first means comprising at least one tongue member extending from the front end of said removable roof substantially horizontally towards the front end of said stationary roof, at least one hollow case on the stationary roof in the vicinity of the front end of said removable roof and having a recess into which said tongue member is engageable, and at least one link member located at a position beneath the front end of said removable roof and having first and second ends, said second end being rotatably connected to said removable roof, said link member being rotatable between a substantially horizontal position and a standing position, the stationary roof comprising a latch groove engageable with the first end of said link member when said link member is in said substantially horizontal position; and
   second means arranged on the stationary roof and cooperating with the rear end of said removable roof for securing the rear end of said removable roof onto the stationary roof.

17. The invention as claimed in claim 16 wherein the stationary roof has a downwardly extending step portion defining the opening of the stationary roof, said hollow case being attached to said step portion.

18. The invention as claimed in claim 17 wherein said hollow case comprises a hollow sleeve inserted therein and made of synthetic resin, said recess being defined by the inwardly facing wall surface of said hollow sleeve and extending substantially horizontally.

19. The invention as claimed in claim 18 wherein said hollow sleeve has a central portion at which the cross-sectional size of said recess is minimum, the cross-sectional size of said recess being gradually increased towards the front end and the rear end of said stationary roof.

20. The invention as claimed in claim 17 wherein said removable roof has weather stripping attached to a ontour edge thereof and positioned to engage said step portion.

21. The invention as claimed in claim 16 wherein the stationary roof has an inner circumferential portion extending along a peripheral portion of said removable roof at a position beneath said removable roof, said latch groove being formed on said inner circumferential portion.

22. The invention as claimed in claim 21 wherein said inner circumferential portion has an inner edge on which weather stripping is affixed, said weather stripping defining said opening of the stationary roof and being arranged to be engageable with the lower face of said removable roof.

23. The invention as claimed in claim 16 wherein said removable roof has a lower face and a downwardly extending flange on said lower face of said removable roof, said tongue member being integrally formed on said flange, the second end of said link member being rotatably connected to said flange.

24. The invention as claimed in claim 23 wherein said link member has a U-shape.

25. The invention as claimed in claim 23 comprising a spring engaging said link member for biasing said link member from said substantially horizontal position towards said standing position.

26. The invention as claimed in claim 16 wherein said stationary roof comprises a lower face and said second means comprises:
   a base attached to said lower face of said stationary roof;
   at least one additional link member having first and second ends, said second end of said additional link member being pivotally connected to said base; and
   a handle member interconnecting the first end of said additional link member to the rear end of said removable roof, said handle member being movable from a position wherein said removable roof is completely closed to a position wherein said removable roof is partially opened.

27. The invention as claimed in claim 26 wherein said base has at least one bore formed thereon, the second end of said link member having a projection which is engageable with said bore, said second means further comprising a spring connected to the first end of said link member to spring load said link member towards said bore to maintain the engagement relationship between said projection and said bore.

* * * * *